(12) United States Patent
Hiley

(10) Patent No.: US 9,032,909 B2
(45) Date of Patent: May 19, 2015

(54) TREATMENT APPARATUS AND METHOD

(75) Inventor: Richard J. Hiley, Chinnor (GB)

(73) Assignee: AMBIC EQUIPMENT LIMITED, Witney (GB)

( * ) Notice: Subject to any disclaimer, the term of this patent is extended or adjusted under 35 U.S.C. 154(b) by 416 days.

(21) Appl. No.: 13/164,596

(22) Filed: Jun. 20, 2011

(65) Prior Publication Data

US 2012/0180240 A1    Jul. 19, 2012

(30) Foreign Application Priority Data

Jun. 21, 2010   (GB) .................................. 1010376.0

(51) Int. Cl.
*A01J 7/04*    (2006.01)

(52) U.S. Cl.
CPC .......................................... *A01J 7/04* (2013.01)

(58) Field of Classification Search
USPC .................................. 119/650, 652, 670, 673
See application file for complete search history.

(56) References Cited

U.S. PATENT DOCUMENTS

| | | | |
|---|---|---|---|
| 5,081,735 A | 1/1992 | Wyatt et al. | |
| 5,479,674 A | 1/1996 | Gilcrest | |
| 7,156,052 B2 * | 1/2007 | Maupin et al. | 119/661 |
| 7,165,510 B2 * | 1/2007 | Hakes | 119/664 |
| 7,387,086 B2 | 6/2008 | Hakes | |
| 2006/0102095 A1 * | 5/2006 | Hakes | 119/652 |
| 2006/0107904 A1 * | 5/2006 | Hakes | 119/652 |
| 2009/0084324 A1 * | 4/2009 | Hiley | 119/652 |
| 2010/0083903 A1 * | 4/2010 | Hiley et al. | 119/14.47 |
| 2011/0083612 A1 * | 4/2011 | Hakes et al. | 119/652 |
| 2012/0145083 A1 * | 6/2012 | Van Den Berg et al. | 119/14.08 |
| 2012/0222628 A1 * | 9/2012 | Maupin et al. | 119/661 |

\* cited by examiner

*Primary Examiner* — Richard Price, Jr.

(74) *Attorney, Agent, or Firm* — Stephen S. Rabinowitz; Hughes Hubbard & Reed LLP

(57) ABSTRACT

The present invention provides treatment apparatus, a fluid application device and methods of removing and applying fluid and relates particularly but not exclusively to an apparatus and method suitable for applying fluid to an elongate object such as a bovine teat or the like and to removing excess fluid. The device includes a holder (28) having a first end (58) and a second end (62) and an interior edge (54) defining a first opening, the first end having a second opening (56); a lower portion (70); and a cassette (30) for insertion into the second opening (56) and including a wiping device (32) having a wiping material (82, 84, 86) extending radially inwardly and extending at least partially across the first opening.

27 Claims, 10 Drawing Sheets

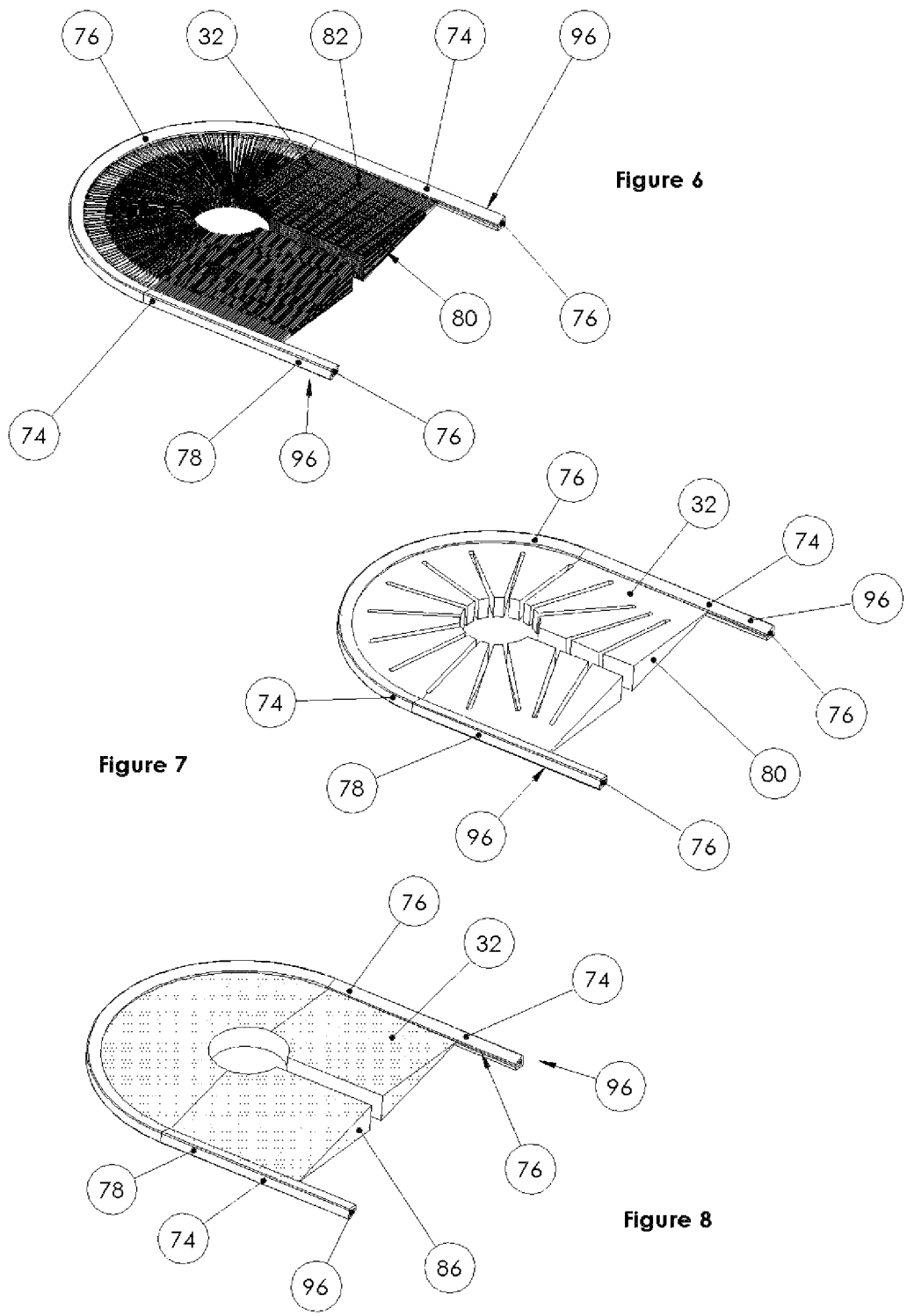

TREATMENT APPARATUS AND METHOD

BACKGROUND OF THE INVENTION (1) Field of the invention

The present invention relates to a treatment apparatus, a fluid application device and methods of removing and applying fluid and relates particularly but not exclusively to an apparatus and method suitable for applying fluid to an elongate object such as a bovine teat or the like and for removing excess fluid therefrom. Such an apparatus may be employed for the application of a disinfecting or teat-treating liquid to the teat of a cow and is commonly referred to as a dip-cup and is referred to herein as such and wherein said fluid is often referred to as "solution."

(2) Description of Related Art

An example of a dip-cup is shown in U.S. Pat. No. 7,387,086 to Hakes which discloses both a method and a device for applying germicide solutions to a cattle teat and includes a chamber defined by a body having an open first end and a closed second end which receives the germicidal solution. The body interior further includes a support, referred to as a "circumvolving inner ring," for supporting a wiping device that is configured to fit within the interior of the body and rest on the inner ring. The wiping device is held in place by a clip, which is relatively difficult to manipulate.

As an alternative to providing a special dip-cup body, some makers of dip-cups have offered retrofit kits designed to hold wiping devices over the top of an otherwise standard dip-cup. One such dip-cup retrofit kit is marketed by RJB Company, Inc. under the name "Power Dipper+." Another dip-cup retrofit kit is marketed by Ambic Equipment Ltd. under the name "DipMizer." To remove and replace a wiping device, as must be done frequently, existing dip-cup retrofit kits require assembly and disassembly that is relatively time-consuming and difficult, and can lead to wear or damage of components.

BRIEF SUMMARY OF THE INVENTION

The present invention aims at overcoming a number of drawbacks in prior art dip-cups. A preferred arrangement is such as to form an addition or adaptation of the top portion of dip-cup chamber to support a novel removable cassette in which the wiping device is mounted, the removable cassette being arranged to slide into and out of an engagement portion within an adaptor or a modified dip-cup top portion, thereby providing easy removal for cleaning purposes or replacement.

According to one aspect of the present invention there is provided an apparatus comprising a holder having a first end and a second end and an interior edge defining a first opening, a first end having a second opening; a lower portion; and a cassette for insertion into said second opening and including a wiping device having a wiping material extending radially inwardly and for extending at least partially across said first opening.

Advantageously, said holder further includes a guide channel extending within said interior edge between said first and second ends and said cassette includes an edge for engagement therein. The holder may include a curved portion at said second end thereof for receiving a curved portion of said cassette. Preferably, the apparatus includes a retaining mechanism for retaining said cassette within said holder. When provided, said retaining mechanism may comprise an interference fit between at least a portion of said guide channel and at least a portion of said cassette or a dimple and indent for engagement with each-other when said cassette is in a desired position. In an arrangement, said cassette is spaced from said channel for at least a portion thereof. In some arrangements the lower portion may comprise a resilient material for fitting over a top portion of a dip-cup chamber but in other arrangements it may comprise a generally rigid material or may be integrated with a top portion of the dip-cup itself. In a preferred arrangement, said cassette comprises two portions and said wiping device is mounted therebetween. An inner edge may further include a channel extending around said inner edge for receiving said wiping device. The apparatus may also include a locking mechanism for locking said two portions together. The second portion of said cassette includes wall portions for defining a space into which a portion of said wiping device may be located. In one arrangement the wiping device comprises a generally D shaped arrangement having a generally straight portion and a generally arcuate or curved portion and a material retaining portion which forms an outer edge thereof. Whilst the wiping material may comprise any one of a number of suitable materials it is preferably selected from the group comprising bristle elements, material fingers and sponge material. Advantageously, the wiping device is configured such as to define a hole therein for receiving a teat or the like which may otherwise be defined as means defining an aperture formed by said wiping material. The aperture may be a proper closed aperture of a generally circular shape or may include an extension portion in the form of an elongate slot extending from said aperture and formed by edges of the wiping material. In one arrangement the apparatus further includes an immersion chamber for receiving a solution S and comprising a body having at least an open first end. Still further, the apparatus may include an immersion chamber for receiving a solution S and comprising a body having at least an open first end and further including a reservoir for receiving a supply of solution S and a conduit for supplying said solution from said reservoir to said chamber.

According to another aspect of the present invention there is provided a method of treating a teat of an animal with an apparatus as described in part or in whole above comprising the steps of:

(i) Introducing a teat into the chamber by passing it through aperture;

(ii) causing an amount of solution (S) to be passed into said treatment chamber such as to at least partially contact said teat; and (iii) removing said apparatus from said teat thereby to cause said wiping device to wipe excess solution (S) from said teat.

According to another aspect of the present invention there is provided a cassette for an apparatus as described above and comprising two portions and said wiping device is mounted therebetween. The cassette may include an inner edge and may further include a channel extending around said inner edge for receiving said wiping device. If desired, the cassette may also include a locking mechanism of any suitable form for locking said two portions together, although a "click-lock" or an adhesive may also prove particularly suitable. Preferably, said second portion of said cassette includes wall portions for defining a space into which a portion of said wiping device may be located.

The present invention will now be more particularly described by way of example only with reference to the following drawings, in which;

BRIEF DESCRIPTION OF THE DRAWINGS

FIGS. 6 to 8 are general views of various forms of wiping device for fitting into the cassette shown in the above-mentioned drawings;

DETAILED DESCRIPTION OF THE INVENTION

Figure 1:
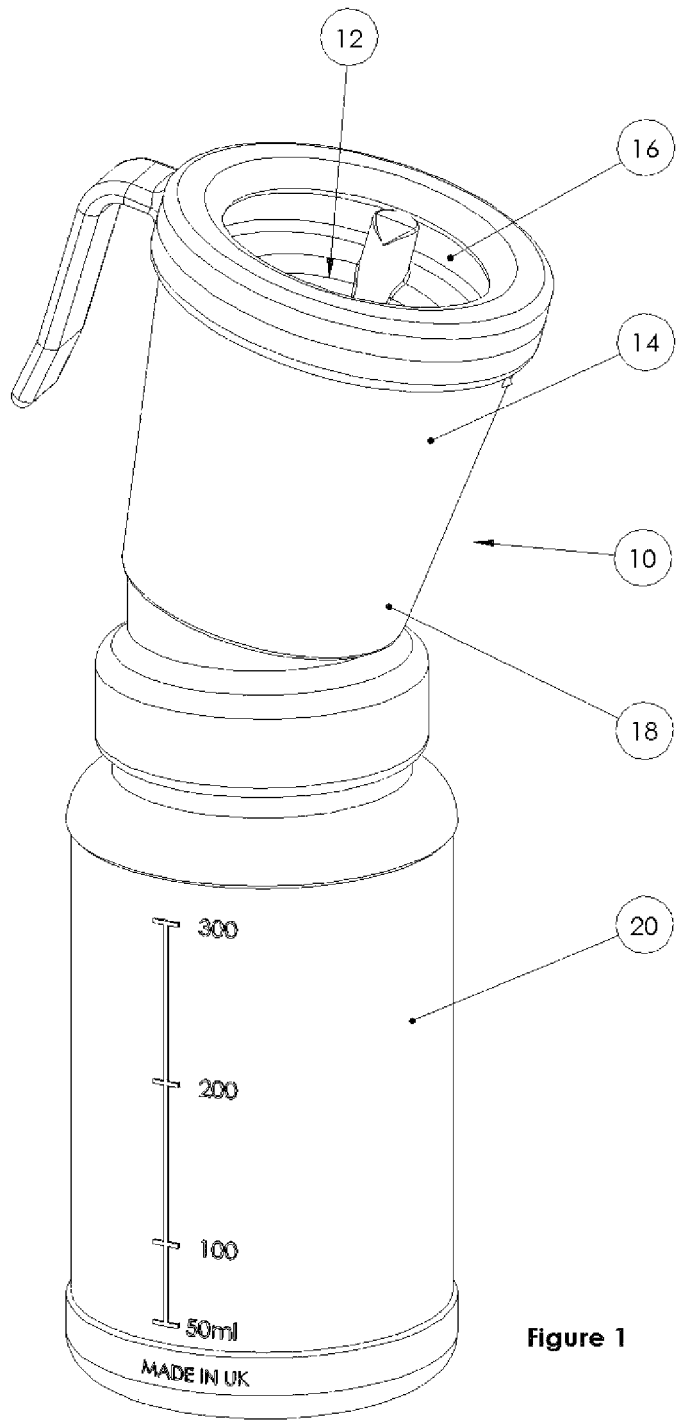
FIG. 1 is a representation of a prior art device to which the present invention may be applied.

Referring now to FIG. 1 which illustrates a typical dip-cup 10 well known in the art, it will be appreciated that such devices generally include an immersion chamber 12 defined by a body 14 having an open first end 16 and a closed second end 18 which receives the germicidal solution, best seen in later drawings. The dip-cup 10 further includes a reservoir 20 for containing the germicidal solution S and a conduit 22 best seen in FIG. 5 for conveying said solution to said chamber 12 such as to fill at least a bottom portion thereof 24 (FIG. 5) and allow said fluid to be used for treatment purposes. In the example shown, the reservoir comprises a flexible material which allows for manual squeezing thereof such as to displace and pump a portion of the solution through conduit 22 and into the chamber 12. However, it will be appreciated that other forms of reservoir are available including remote chambers having a pumping system associated therewith which may be used as an alternative method of storing and transporting solution S to said chamber 12. Such an alternative is shown, by way of example only, in FIG. 17. The reader will appreciate that alternative forms of dip-cup exist having a supply of solution directed to other portions of the chamber 12 including the bottom and side portions thereof and that the present invention may be directed equally well to such alternative arrangements.

Figure 2:
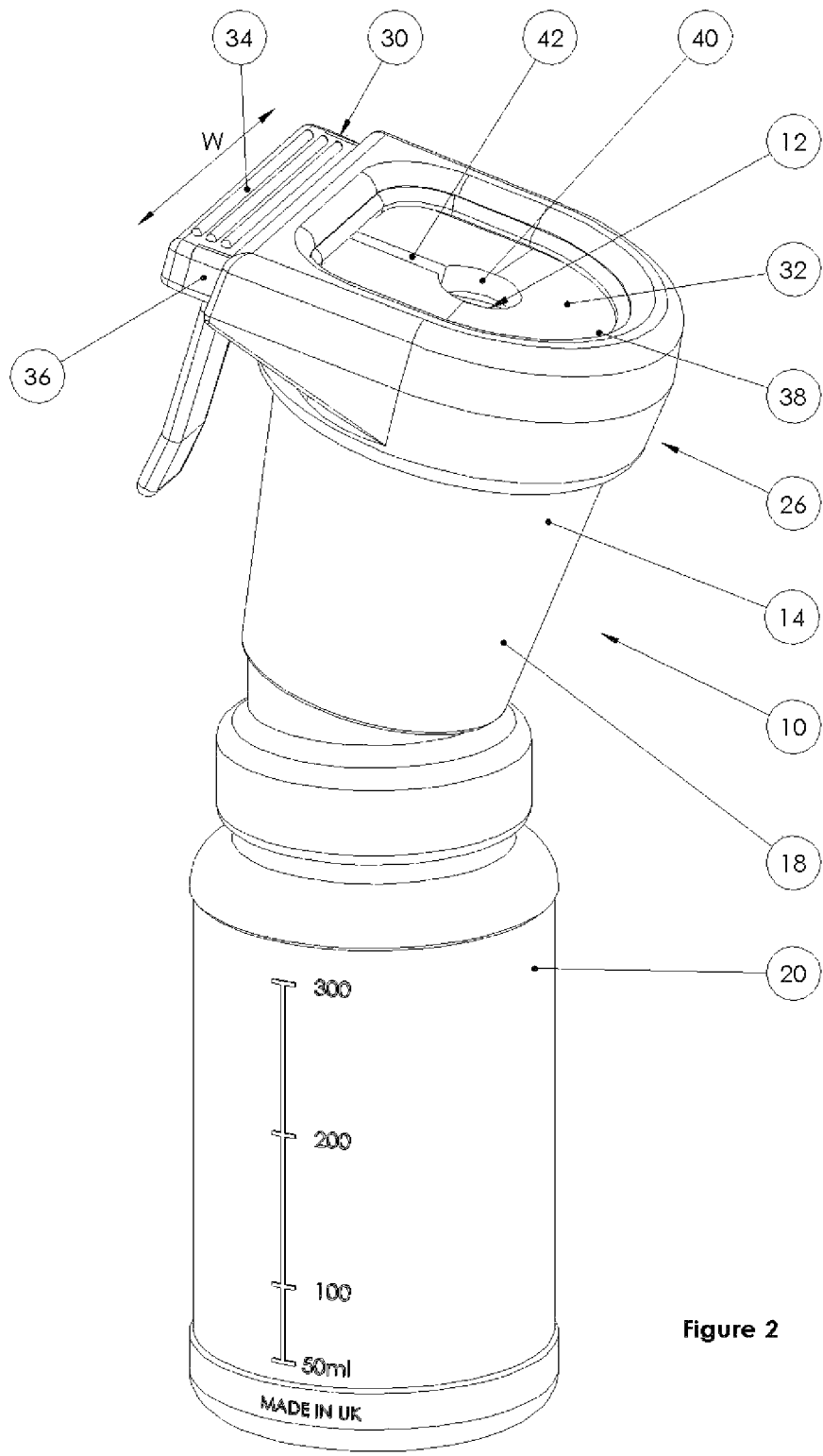
FIG. 2 is an isometric view of a dip-cup incorporating the present invention by means of a modification of the prior art dip-cup or as an adaptor for fitting on such a prior-art arrangement.

FIG. 2 is a general view of the present invention shown either as an addition to an already existing dip-cup or a modification thereof which incorporates the features of the present invention. From FIG. 2 it will be appreciated that a top portion or adaptor 26 is added to the dip-cup 10 shown in FIG. 1 and it is this portion either alone or in combination with the remaining portion of the dip-cup 10 that forms the core of the present invention. In more detail, the adaptor 26 comprises a holder portion 28, a removable cassette 30 and a wiping device 32 positioned within the cassette 30. The remaining portions of the dip-cup comprise the elements known in the art such as an immersion chamber 12 defined by a body 14 having an open first end 16 (FIG. 5) and a closed second end 18 which receives a germicidal solution S. The dip-cup 10 further includes a reservoir 22 for containing the germicidal solution S and a conduit 22 for conveying said solution to said chamber 12 such as to fill at least a bottom portion thereof 24 and allow said fluid to be used for treatment purposes. In the example shown, the reservoir comprises a flexible material which allows for manual squeezing thereof such as to displace and pump a portion of the solution S through conduit 22 and into the chamber 12. However, it will be appreciated that other forms of reservoir are available including remote chambers having a pumping system associated therewith which may be used as an alternative method of storing and transporting solution S to said chamber 12. The reader will appreciate that the portion of the dip-cup to which the present invention relates most particularly is the chamber portion 12 and will further appreciate that the present invention may be applied to any number of dip-cup arrangements regardless of the mechanism for delivering solution to the actual chamber 12 itself. The reader will further appreciate that the alternative forms of dip-cup include those having a supply of solution directed to other portions of the chamber 12 including the bottom and side portions thereof and that the present invention may be directed equally well to such alternative arrangements.

Figure 3:
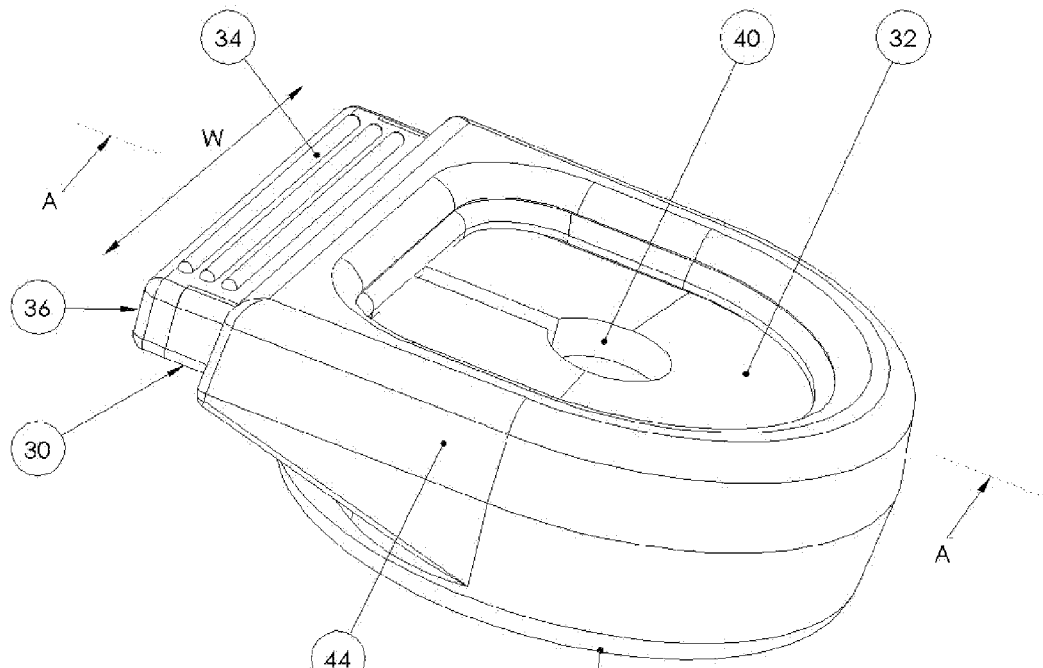
FIG. 3 is a general view of an adaptor for fitting to a standard dip-cup view taken in the direction of arrow P in FIG. 2.
Figure 4:
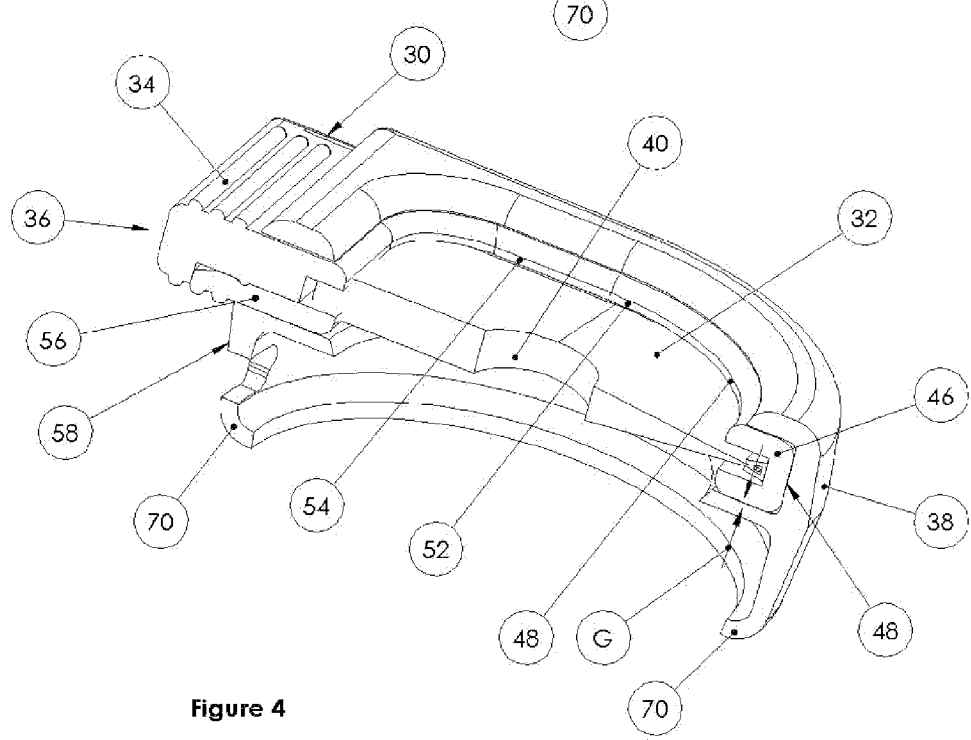
FIG. 4 is a cross-sectional view taken in the direction of arrows A-A in FIG. 3.

Referring now to FIGS. 3 and 4, it will be seen that the cassette 30 which is partially covered by the adaptor 26 includes a finger grip portion 34 at, for example, a first end 36 thereof and the wiping device 32 at, for example, a second end 38 thereof, both of which are shown in more detail in later drawings. Whilst not shown in detail in FIG. 3 or 4, it can be seen that the cassette 30 is generally narrower across its width W than the adaptor 26 and projects into said adaptor in a manner which allows it to be retained therein during use but removable therefrom when desired, such as for cleaning or replacement purposes. The wiping device is described in more detail with reference to FIGS. 6 to 8 but it will be appreciated from FIG. 3 that the arrangement thereof is to provide a central aperture 40 through which, in use, the bovine teat may pass. An optional additional slot portion 42 which effectively extends the aperture 40 may also be provided and extending along an axis A such as to increase the effective open area of the aperture and provide a lead in or guidance portion to help in the introduction of a teat into the chamber 12. The provision of slot 42 also aids and simplifies the production process as the wiping device 32 may be made as a straight length and then simply bent to shape such that the ends thereof approach but do not need to touch each other, thus forming optional slot 42. The slot may be eliminated if a closer wiping of the teat is desired. Another, optional, feature of the design includes a straight edge portion 44 (best seen in FIG. 10) of the cassette 30 towards the first end 36 thereof which may be used to advantage in the present invention such as to provide a drawer and runner type arrangement for allowing the cassette 30 to be inserted and removed from the adaptor 26. A still further optional feature comprises a curved portion 46 at the second end 38 for location within a correspondingly shaped curved groove portion 48 in the adaptor itself. Both these arrangements and the usefulness thereof will be described in more detail later herein.

Figures 5, 5A:
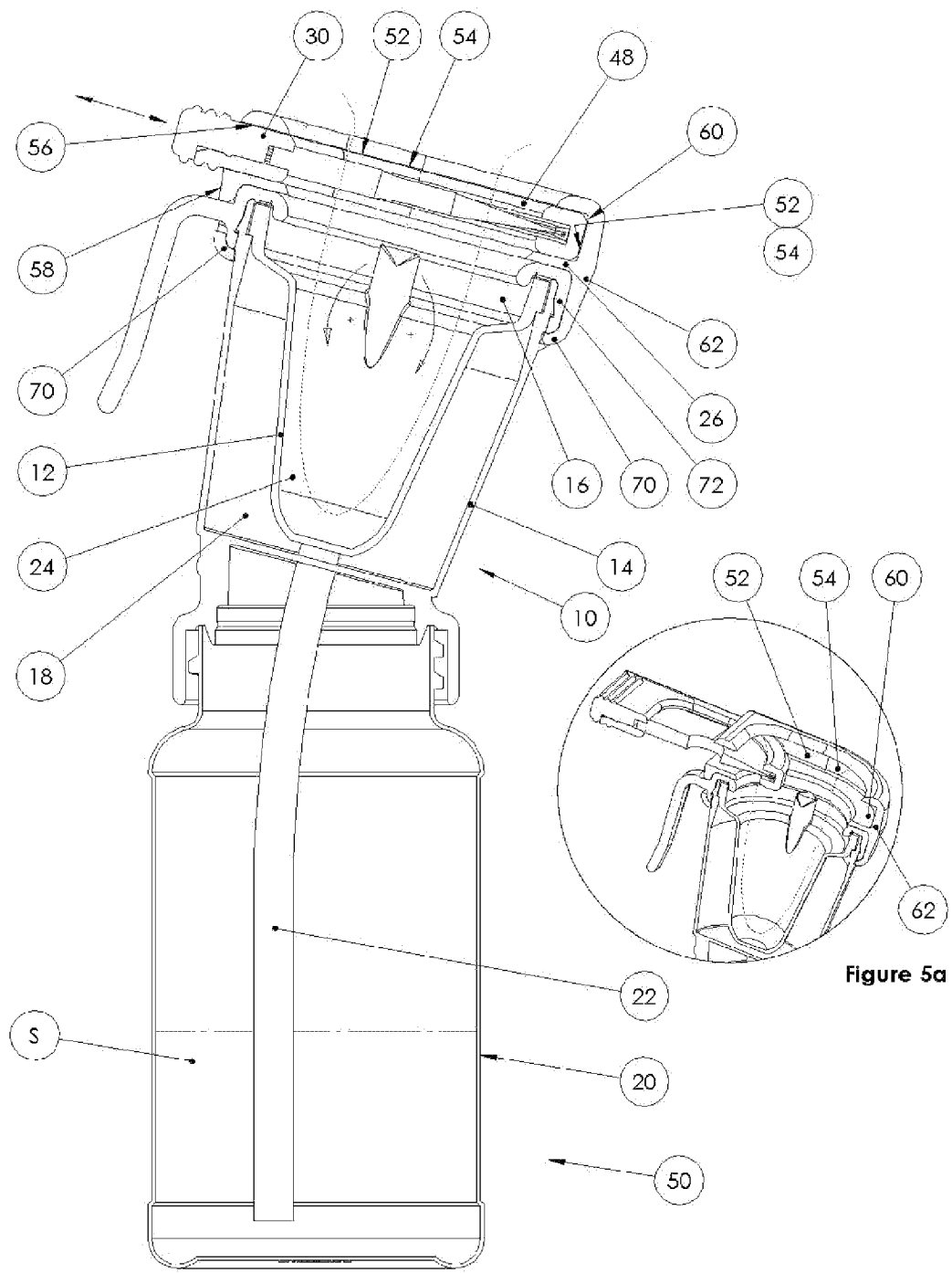
FIG. 5 is a cross-sectional view of the assembly shown in FIG. 2
Figure 9:
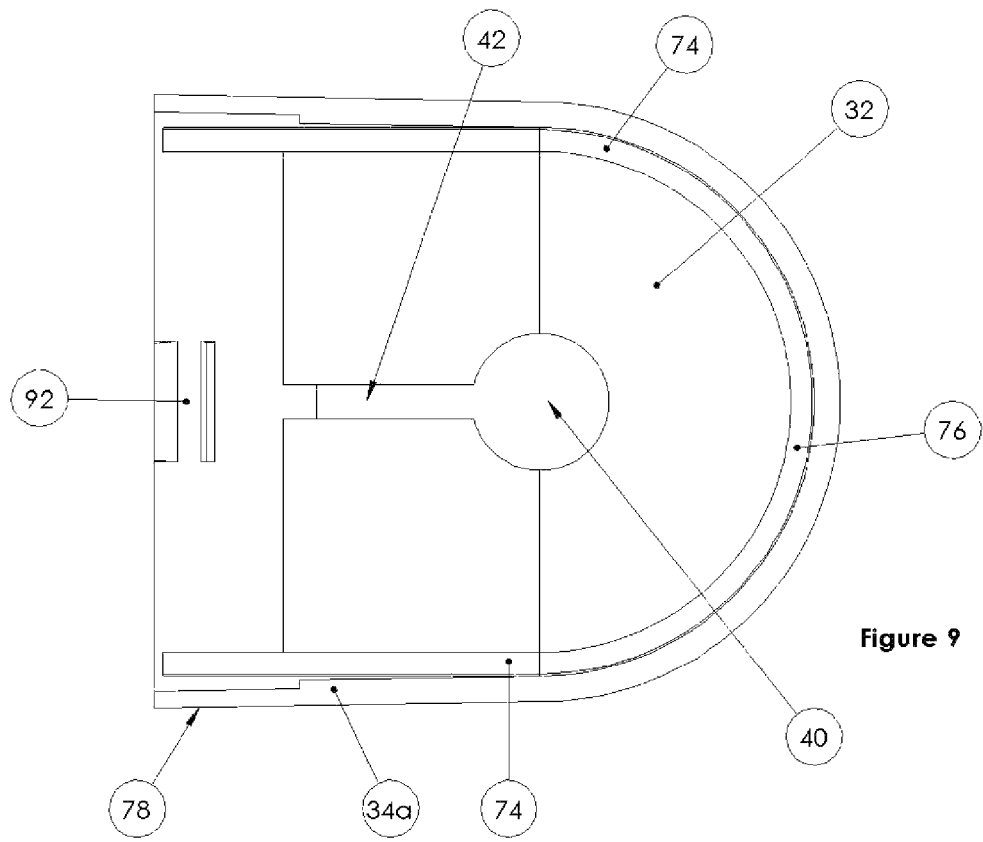
FIG. 9 is a detailed plan view of a portion of the cassette and brush arrangement shown in FIGS. 2 to 5.

FIG. 5 is a cross-sectional view of the combined dip-cup/adaptor arrangement 50 and is provided herein to illustrate the interrelation of the adaptor 26 with the remaining portions of the dip-cup. The arrangement of the dip-cup chamber 12 and reservoir 20 and the supply conduit arrangement 22 have been described above and are not, therefore, repeated here other than to highlight that the cup itself may equally be provided on the end of an extended lance or handle and may be connected to a remote source of solution by means of an elongate supply conduit (not shown) and an optional pump arrangement (not shown). Of particular interest in FIG. 4 is the relationship between the cassette 30 and the adaptor 26 in which it is held and the arrangement which allows the adaptor 26 to be removably attached to the top of a conventional dip cup as an option to being integrated therewith, both of which will now be discussed in more detail. Referring firstly to the relationship between the cassette 30 and the adaptor 26, it will be appreciated that the adaption itself 26 includes a generally D shaped guide channel 52 provided along and within an interior edge 54 thereof which extends from an opening 56 at a first end 58 through which the cassette 30 is inserted and towards and around an inner portion 60 at a second end thereof 62. The size and position of the channel 52 may be such as to provide the cassette 30 with a loose or a relatively tight fit therein but both arrangements should be such as to allow removal of the cassette from the opening 56 as and when required. When the arrangement is such as to provide a loose fit it may be desirable to provide a retaining mechanism 64 to retain the cassette 30 within the adaptor 26. Whilst the reader will appreciate that such a retaining mechanism 64 may take any one of a number of forms, it has been found that a simple dimple 66 and indent 68 arrangement (not shown) can be employed to good effect as it allows the cassette 30 to slide easily into the opening 56 and along the guide channel 52 before the dimple 66 and indent 68 engage with each other and prevent inadvertent movement of the cassette 30 itself. If a tighter or more secure fit is required the relative size and shape of the guide channel 52 relative to the cassette 30 may be selected such that, for at least a portion of the length of the guide channel 46, an interference fit exists between the guide channel 46 and the cassette 30 such as to cause both a resistance to insertion of the cassette 30 and a resistance to the removal thereof whilst not preventing insertion or removal. In one preferred arrangement the interference fit or retaining mechanism 64 is provided along a relatively short portion of the straight edge portion 44 such as to allow the majority of the cassette 30 to be inserted before the retention mechanism 64 is engaged. Indeed, should easy insertion and removal of the cassette 30 be a desire or requirement, the dimensions and positions of the curved portion 46 of the cassette 30 and the corresponding curved groove portion 48 of the adaptor 26 itself may be chosen to allow a loose fit therebetween created by a gap G best seen in FIG. 4. Indeed the gap G may be such as to allow the curved portion 46 of the cassette 30 to effectively float in free space within the guide channel 52 thereby to allow for the easy removal of the cassette 30 and/or the easy removal of dirt and other objects from the area surrounding the curved 46 portion that may otherwise jam or damage the assembly or otherwise interfere with the effective operation thereof. The guide channel 52 or all of the adaptor 26 itself may be made of a resilient flexible thermo-plastic rubber (TPR) material or any suitable chemically resistant and possibly inert material such as to provide the required degree of gripping of the cassette 30 within the adaptor 26 which then forms the retaining mechanism 64 as an alternative to that described above. Indeed, the use of such flexible materials on other portions of the adaptor 26 such as at a lower portion 70 would allow the adaptor 26 itself to be easily fitted onto and removed from the top 72 of a standard dip-cup arrangement, such as to provide a true adaptor for retro-fitting to existing dip-cups. More ridged materials may be employed as and when desired, particularly if the adaptor 26 is intended to be more resiliently mounted on a dip-cup or intended not to be easily removed therefrom once applied thereto. In such an arrangement the adaptor 26 effectively forms a completely separate portion rather than an integral portion of the dip-cup. As an alternative, the adaptor 26 may actually be formed integrally with a portion of the dip-cup itself such as the top portion 72 which is often a separate removable or non-removable portion added to the dip-cup as a retaining portion for retaining the chamber 12 within the dip-cup and providing a splash guard or barrier to prevent surplus liquid being inadvertently dislodged from the chamber during rough handling.

Referring now to FIGS. 6 to 8 in turn which illustrate different forms of wiping device 32, it will be appreciated that they comprise a generally D shaped arrangement having a generally straight portion 74 and a generally arcuate portion 76 which may have varying degrees of arc and need not be a continuous curve; indeed, in some arrangements portion 76 may be formed into a flat ended portion and may comprise a series of linked straight portions connecting with the generally straight portions 74. The wiping device 32 is provided with a material retaining portion 76 which effectively forms an outer edge thereof 78 for engagement with the cassette 30. Preferably, the material retention portion comprises a deformable material having a generally U shaped cross-sectional profile such as to allow for the insertion of wiping material 80 therein and retention thereby by deformation of the deformable material such as to grip the wiping material 80. Other arrangements will, however, present themselves to those skilled in the art. A range of wiping materials may be used including bristle elements 82 arranged in a plurality of layers, as shown in FIG. 6, a plurality of fingers or elongate members 84, as shown in FIG. 7, or a simple sponge, foam or soft material arrangement 86, as shown in FIG. 8. Such materials 82, 84, 86 may be made from medical grade and bio-resistant materials if so desired. When a sponge or foam material is used this may be open or closed cellular depending on the requirements of the wiping surface. The material retaining portion 76 may be formed into the generally D shaped form either before or after the wiping material 80 is inserted therein.

Figure 10:
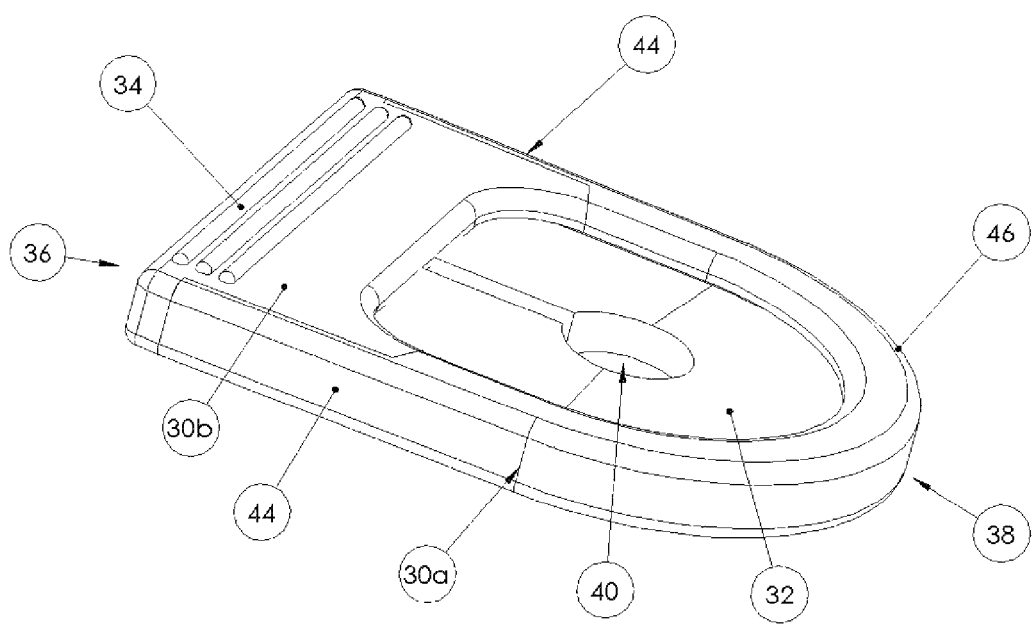
FIG. 10 is an isometric view of a cassette of FIGS. 2 to 4 and 9.
Figure 11:
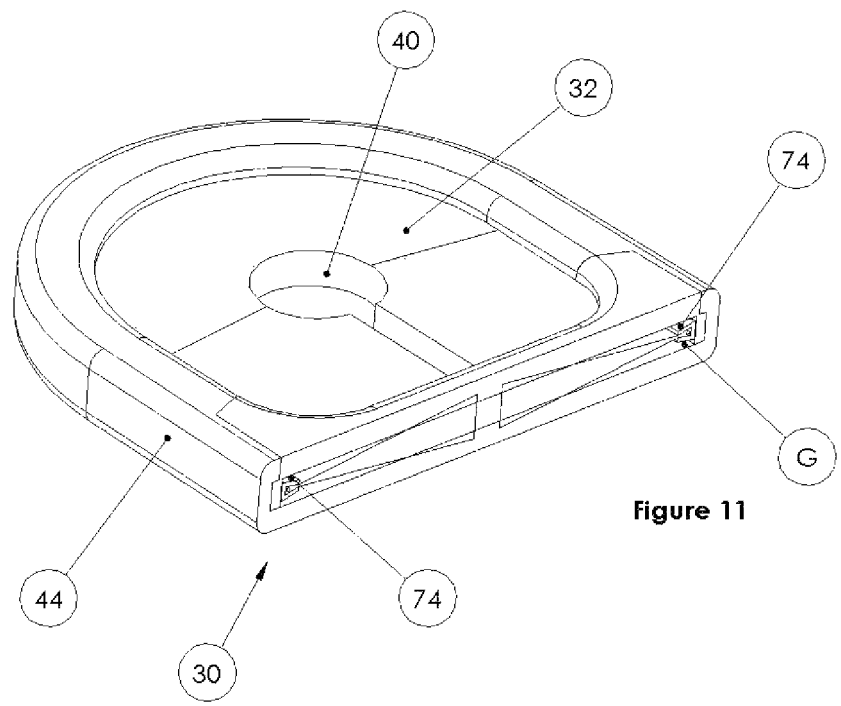
FIG. 11 is a cross-sectional view of a cassette portion of the present invention.
Figure 12:
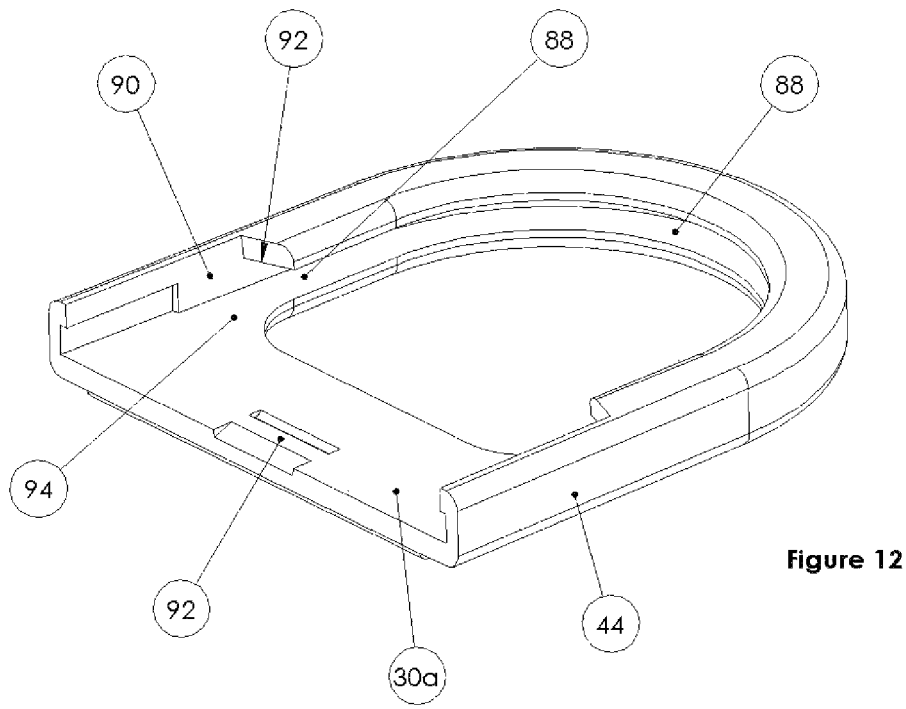
FIG. 12 is an isometric view of a portion of the cassette of FIG. 10.
Figure 13:
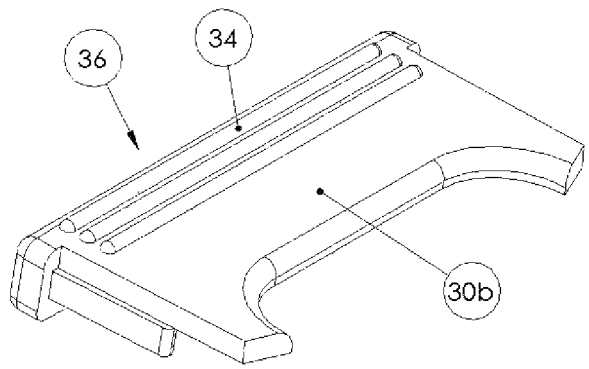
FIG. 13 is an isometric view of a further portion of the cassette of FIG. 10.
Figure 14:
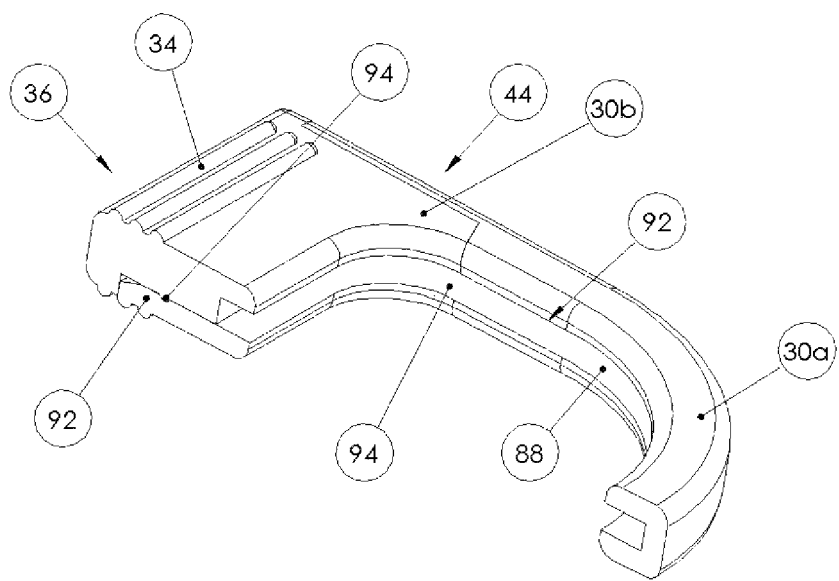
FIG. 14 is a further cross-sectional view of the assembled cassette of FIG. 10 shown without the wiping portion.

FIGS. 9 to 16 illustrate the integration of the wiping device 32 into the generally D shaped cassette 30 and from which it will be appreciated that the cassette 30 may comprise two separable portions 30a and 30b as best seen in FIG. 10 The first portion 30a includes a channel (best seen in FIG. 12) which extends around an inner edge 90 thereof for receiving said wiping device 32 and a top edge 92 and bottom edge 94 which act to cover at least a portion of the wiping device and prevent it from being removed from the cassette 30. An optional "click-lock" arrangement is provided at 92 for engagement and locking with a corresponding portion 94 on the second portion 30b. The two portions 30a, 30b are joined to each other by offering up portion 30b to portion 30a and causing the click-lock 92 to engage. Other securing methods such as pinning or heat welding or an adhesive may be used as an alternative.

Figure 15:
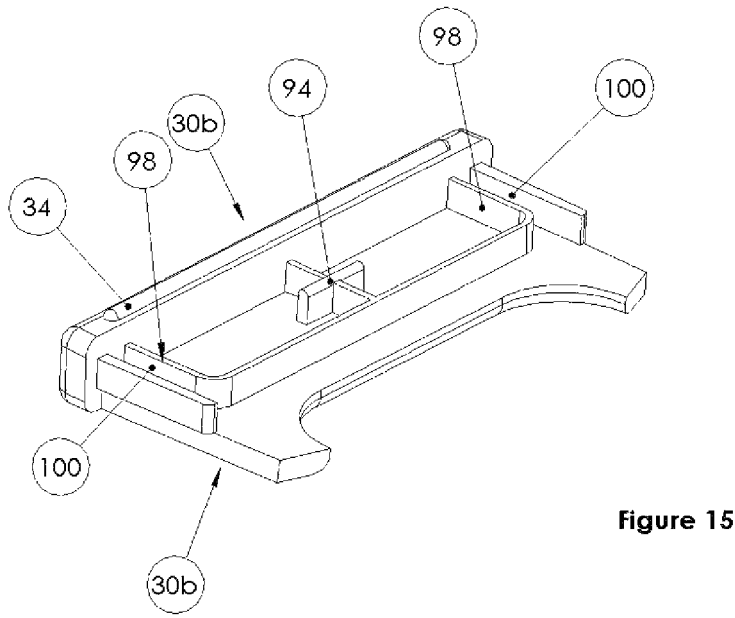
FIG. 15 is a view of the underside of the cassette portion shown in FIG. 14.
Figure 16:
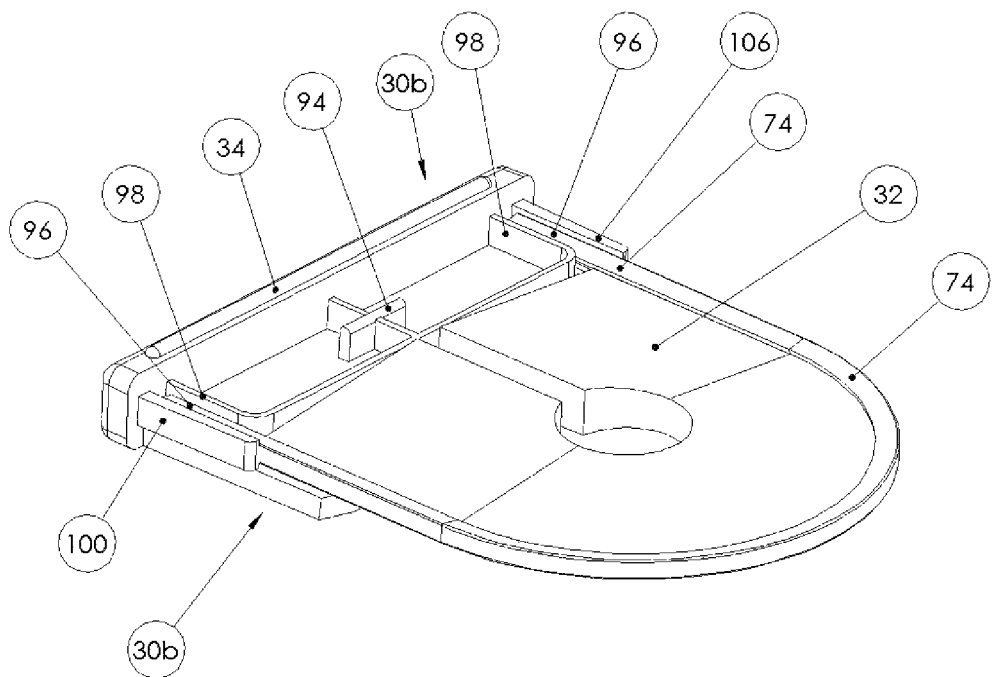
FIG. 16 is a part assembly showing how the wiping member XX is positioned relative thereto.

FIGS. 15 and 16 illustrate in more detail how the wiping device 30 is mounted within the cassette 30 and from which it will be appreciated that optional extension portions 96 may be provided on the wiping device and arranged to be insertable between corresponding wall portions 98 and 100 provided on the second portion 30*b*.

Figure 17:
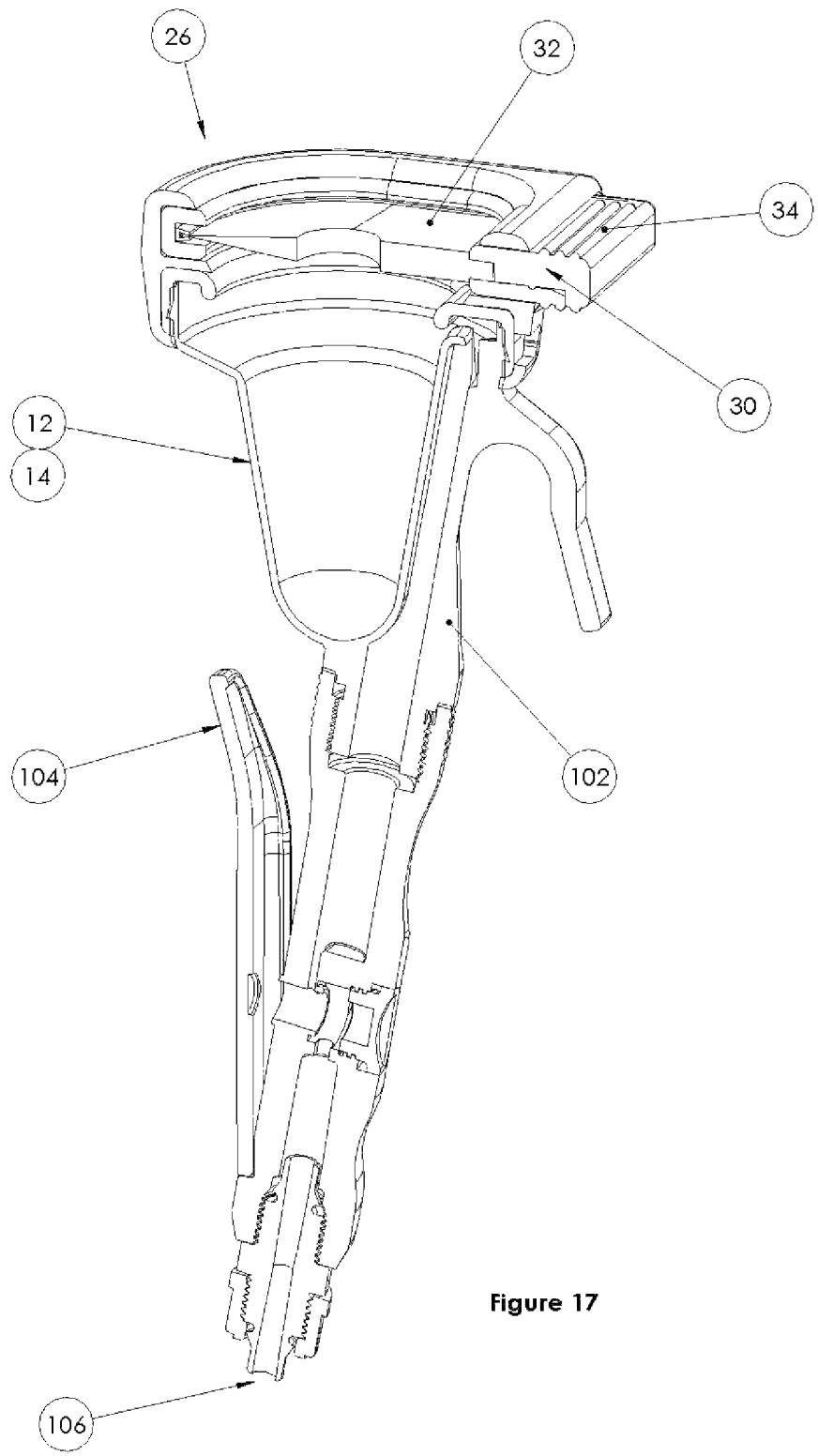
FIG. 17 illustrates the present invention applied to a dip-cup arrangement having a remote source of solution.

FIG. 17 illustrates the present invention in combination with a lance type applicator 102 having a trigger valve arrangement 104 for allowing or preventing solution S to be supplied via a flexible supply tube 106 from a remote source thereof 108. The adaptor 26 may be applied to the cup portion 14 in the manner described above and, therefore, not discussed in more detail here.

Operation of the above arrangements is achieved by first charging the reservoir 20 or 108 with solution S and causing a quantity of said solution S to be supplied to the bottom portion 24 of the chamber itself. In the arrangements shown herein the solution is supplied directly to the immersion chamber itself 12 at a point below and spaced from the wiping device such as to cause solution to fill the chamber. A teat shown schematically as the dotted lines 110 in FIG. 5 may then be inserted into the chamber 14 by passing it through the aperture 40 within the wiping device 32. Once the teat is suitably inserted it is immersed in a bath of solution at the bottom 24 of the chamber 14 such as to sanitise or otherwise treat said teat. Once treated, the teat 110 may be removed from the chamber 14 by lowering the dip-cup away therefrom and allowing the wiping device to remove any surplus solution as the teat is removed, as known in the art. It will be appreciated that the chamber as shown in FIG. 5 is shaped to the general contour of a teat in that it tapers towards the bottom end thereof and the solution is supplied to the upper end at opening 16 such that it cascades or flows downwardly in the direction of the arrows between the chamber and the teat itself. The application of solution is undertaken after the teat has been placed in the chamber and the application process takes advantage of the reduced volume in the chamber after the insertion of the teat to keep the amount of solution required for treatment to a minimum. Such is not the case in some prior art arrangements which have much larger chambers and rely on immersion of the teat in a relatively larger volume of pre-supplied solution, much of which will remain in the larger chamber after the teat is removed and may contribute to cross-contamination. It will also be appreciated that the present invention may equally well be applied to each of the prior art arrangements but is particularly effective when combined with the arrangement of FIG. 5.

It will be appreciated that the cassette 30 as shown and described above may be inserted and removed from aperture 56 as and when required. Insertion simply requires the cassette 30 to be introduced into the aperture 56 and pushed inwardly such as to allow the wiping device 32 to pass over the open first end 16 such as to present aperture 40 within the central region thereof. Removal is simply the reverse of insertion and for this purpose the user may simply use the finger grip portion 34, as described above. The reader will appreciate that the use of a cassette arrangement will allow an operator to swop cassettes much more easily than is possible with the prior art devices and will allow said operator to replace the wiping device between animals or regularly without unduly delaying the treatment process. Still further, the cassette arrangement would allow for the use of different types or forms of wiping material as and when required in the treatment process and will also allow for easier sanitising of the wiping device between uses.

The invention claimed is:

1. An apparatus (26) comprising a holder (28) having a first end (58) and a second end (62) and an interior edge (54) defining a first opening, said first end having a second opening (56);

a lower portion (70); and
a cassette (30) adapted for removable insertion into said second opening (56), said cassette including a wiping device (32) having a wiping material (82, 84, 86), said wiping material extending radially inwardly and extending at least partially across said first opening (56).

2. The apparatus of claim 1 wherein said cassette (30) is adapted to fit above a dip cup chamber (12).

3. The apparatus of claim 1 wherein said second opening (56) is between an upper surface and a lower surface and extends through said holder to said first opening.

4. The apparatus (26) of claim 1 wherein said holder further includes a guide channel (52) extending within said interior edge (54) between said first and second ends (58, 62) and said cassette includes an edge (44) for engagement therein.

5. The apparatus of claim 4 wherein said cassette (30) is spaced from said channel (52) for at least a portion thereof.

6. The apparatus of claim 1 wherein said holder (28) further includes a curved portion (48) at said second end thereof (62) for receiving a curved portion (46) of said cassette (30).

7. The apparatus of claim 1 which includes a retaining mechanism (64) for retaining said cassette (30) within said holder (28).

8. The apparatus of claim 7 wherein said retaining mechanism (64) comprises an interference fit between at least a portion of said guide channel (52) and at least a portion of said cassette (30).

9. The apparatus of claim 7 wherein said retaining mechanism (64) comprises a dimple (66) and indent (68) for engagement with each-other when said cassette (30) is in a desired position.

10. The apparatus of claim 1 wherein the lower portion (70) comprises a resilient material for fitting over a top portion (72) of a dip-cup chamber (14).

11. The apparatus of claim 1 wherein the lower portion (70) is an integral portion of a dip-cup (10).

12. The apparatus of claim 1 wherein said cassette (30) comprises two portions 30*a* and 30*b* and said wiping device (32) is mounted therebetween.

13. The apparatus of claim 12 wherein said second portion (30*b*) of said cassette (30) includes wall portions (98, 100) for defining a space into which a portion of said wiping device may be located.

14. The apparatus of claim 12, wherein said second portion (30*b*) of said cassette (30) includes wall portions (98, 100) for defining a space into which a portion of said wiping device (32) may be located.

15. The apparatus of claim 1 wherein said cassette (30) comprises two portions 30*a* and 30*b* and an inner edge (90) and further includes a channel (88) extending around said inner edge (90) for receiving said wiping device (32).

16. The apparatus of claim 15 which includes a locking mechanism (92) for locking said two portions (30*a*, 30*b*) together.

17. The apparatus of claim 1 wherein said wiping device (32) comprises a generally D shaped arrangement having a generally straight portion (74) and a generally curved portion (75) and a material retaining portion (76) which forms an outer edge (80).

18. The apparatus of claim 1 wherein said wiping material is selected from the group consisting of bristle elements, filaments, material fingers and sponge material.

19. The apparatus of claim 1 wherein said wiping device includes material defining an aperture (40).

20. The apparatus of claim 19 wherein said material defining said aperture (40) further defines an elongate slot (42) extending from said aperture.

21. The apparatus of claim 1 which includes an immersion chamber (12) for receiving a solution S and comprising a body (14) having at least an open first end (16).

22. A method of treating a teat of an animal with the apparatus of claim 21, said method comprising the steps of:
(i) introducing a teat into the chamber by passing it through aperture (40);
(ii) causing an amount of solution (S) to be passed into said treatment chamber (40) such as to at least partially contact said teat; and
(iii) removing said apparatus from said teat thereby to cause said wiping device (32) to wipe excess solution (S) from said teat.

23. The method claim 22, wherein said apparatus includes an immersion chamber (12) for receiving a solution S and comprising a body (14) having at least an open first end (16) and further including a reservoir (20) for receiving a supply of solution S and a conduit (22) for supplying said solution from said reservoir (20) to said chamber (12).

24. The apparatus of claim 1 which includes an immersion chamber (12) for receiving a solution S and comprising a body (14) having at least an open first end (16) and further including a reservoir (20) for receiving a supply of solution S and a conduit (22) for supplying said solution from said reservoir (20) to said chamber (12).

25. A cassette comprising two portions 30*a* and 30*b* and a wiping device (32) mounted therebetween, wherein said cassette is adapted for removable insertion into the apparatus of claim 1.

26. The cassette of claim 25, wherein said cassette (30) includes an inner edge (90) and further includes a channel (88) extending around said inner edge (90) for receiving said wiping device (32).

27. The cassette of claim 25, which includes a locking mechanism (92) for locking said two portions (30*a*, 30*b*) together.

* * * * *